(12) United States Patent
Thiagarajan et al.

(10) Patent No.: US 10,182,244 B2
(45) Date of Patent: Jan. 15, 2019

(54) FAST ENCODING LOSS METRIC

(71) Applicant: MatrixView, Inc., Sunnyvale, CA (US)

(72) Inventors: Arvind Thiagarajan, Sunnyvale, CA (US); Ravilla Jaisimha, Chennai (IN)

(73) Assignee: MatrixView, Inc., Sunnyvale, CA (US)

( * ) Notice: Subject to any disclaimer, the term of this patent is extended or adjusted under 35 U.S.C. 154(b) by 0 days.

(21) Appl. No.: 15/824,341

(22) Filed: Nov. 28, 2017

(65) Prior Publication Data

US 2018/0084280 A1 Mar. 22, 2018

Related U.S. Application Data

(63) Continuation-in-part of application No. 15/447,755, filed on Mar. 2, 2017.

(60) Provisional application No. 62/513,681, filed on Jun. 1, 2017, provisional application No. 62/487,777, filed on Apr. 20, 2017, provisional application No. 62/474,350, filed on Mar. 21, 2017, provisional application No. 62/302,436, filed on Mar. 2, 2016.

(51) Int. Cl.
| | | |
|---|---|---|
| H04N 7/12 | (2006.01) | |
| H04N 11/02 | (2006.01) | |
| H04N 11/04 | (2006.01) | |
| H04N 19/61 | (2014.01) | |
| H04N 19/91 | (2014.01) | |
| H04N 19/126 | (2014.01) | |
| H04N 19/176 | (2014.01) | |
| H04N 19/625 | (2014.01) | |
| G10L 19/02 | (2013.01) | |

(52) U.S. Cl.
CPC .......... *H04N 19/61* (2014.11); *H04N 19/126* (2014.11); *H04N 19/176* (2014.11); *H04N 19/625* (2014.11); *H04N 19/91* (2014.11); *G10L 19/0212* (2013.01)

(58) Field of Classification Search
CPC .......................... H04N 19/154; H04N 19/176
See application file for complete search history.

(56) References Cited

U.S. PATENT DOCUMENTS

| | | | | |
|---|---|---|---|---|
| 2012/0170658 A1* | 7/2012 | Anderson | ............ | H04N 19/895 375/240.16 |
| 2013/0058395 A1* | 3/2013 | Nilsson | ................ | H04N 19/176 375/240.02 |
| 2014/0112591 A1* | 4/2014 | Kalevo | ..................... | G06T 9/00 382/233 |

(Continued)

*Primary Examiner* — Rebecca A Volentine
(74) *Attorney, Agent, or Firm* — Pillsbury Winthrop Shaw Pittman LLP

(57) ABSTRACT

Provided is a process including: obtaining source and destination video data, the destination video data being a transformed version of the source video data; for a plurality of blocks in the given source frame, determining a respective source aggregate value that is based on a measure of central tendency of pixel values; for a plurality of blocks in the given destination frame, determining a respective destination aggregate value that is based on a measure of central tendency of pixel values; determining a plurality of differences between source and destination aggregate values; determining a frame aggregate value that is based on a measure of central tendency of the determined differences; and determining a measure of distortion of the destination video data based on the frame aggregate value.

21 Claims, 4 Drawing Sheets

(56) References Cited

U.S. PATENT DOCUMENTS

| | | |
|---|---|---|
| 2014/0247872 A1* | 9/2014 | Merkle ................ H04N 19/597 |
| | | 375/240.12 |
| 2015/0271510 A1 | 9/2015 | Wen et al. |
| 2015/0334386 A1 | 11/2015 | Brice et al. |
| 2016/0150230 A1 | 5/2016 | He |
| 2017/0061235 A1* | 3/2017 | Frey ................... G06K 9/00718 |
| 2017/0223363 A1 | 8/2017 | Koteyar et al. |
| 2017/0237983 A1 | 8/2017 | Adsumilli et al. |
| 2017/0249521 A1 | 8/2017 | Brice et al. |
| 2017/0332084 A1 | 11/2017 | Seregin et al. |
| 2017/0339345 A1 | 11/2017 | Chua et al. |
| 2017/0339417 A1 | 11/2017 | Puri |

\* cited by examiner

FAST ENCODING LOSS METRIC

CROSS-REFERENCE TO RELATED APPLICATIONS

This patent filing claims the benefit of U.S. Provisional Patent App. 62/474,350, titled FAST ENCODING LOSS METRIC, filed 21 Mar. 2017; this patent filing is also a continuation-in-part of U.S. patent application Ser. No. 15/447,755, titled APPARATUS AND METHOD TO IMPROVE IMAGE OR VIDEO QUALITY OR ENCODING PERFORMANCE BY ENHANCING DISCRETE COSINE TRANSFORM COEFFICIENTS, filed 2 Mar. 2017, which claims the benefit of U.S. Provisional Patent App. 62/302,436, titled APPARATUS AND METHOD TO IMPROVE IMAGE OR VIDEO QUALITY OR ENCODING PERFORMANCE BY ENHANCING DISCRETE COSINE TRANSFORM COEFFICIENTS, filed 2 Mar. 2016; this patent filing also claims the benefit of U.S. Provisional Patent App. 62/513,681, titled MODIFYING COEFFICIENTS OF A TRANSFORM MATRIX, filed 1 Jun. 2017, and claims the benefit of U.S. Provisional Patent App. 62/487,777, titled ON THE FLY REDUCTION OF QUALITY BY SKIPPING LEAST SIGNIFICANT AC COEFFICIENTS OF A DISCRETE COSINE TRANSFORM MATRIX, filed 20 Apr. 2017. The entire content of each of these earlier-filed application is hereby incorporated by reference.

BACKGROUND

1. Field

The present disclosure relates generally to image compression and, more specifically, to fast encoding loss metrics for video encoding.

2. Description of the Related Art

Data compression underlies much of modern information technology infrastructure. Compression is often used before storing data, to reduce the amount of media consumed and lower storage costs. Compression is also often used before transmitting the data over networks to reduce the bandwidth consumed. Certain types of data are particularly amenable to compression, including images (e.g., still images or video) and audio.

Prior to compression, data is often obtained through sensors, data entry, or the like, in a format that is relatively voluminous. Often the data contains redundancies and less-perceivable information that can be leveraged to reduce the amount of data needed to represent the original data. In some cases, end users are not particularly sensitive to portions of the data, and these portions can be discarded to reduce the amount of data used to represent the original data. Compression can, thus, be lossless or, when data is discarded, "lossy," in the sense that some of the information is lost in the compression process.

A common technique for lossy data compression is based on the discrete cosine transform (DCT). Data is generally represented as the sum of cosine functions at various frequencies, with the amplitude of the function at the respective frequencies being modulated to produce a result that approximates the original data. Another example is asymmetric discrete sine transform (ADST). At higher compression rates, however, a blocky artifact appears that is undesirable.

Often traditionally, artifacts and other losses in image compression are measured with a metric referred to as peak signal-to-noise ratio (PSNR). In some cases, this metric may be relatively computationally expensive, often requiring a relatively slow calculation on every pixel in an image (which is not to suggest that this attribute or any other is disclaimed in all embodiments). This problem is expected to be aggravated as higher-resolution, higher-frame rate video is deployed more widely, particularly on less powerful computing devices. As a result, it can be difficult to calculate these metrics on the fly and dynamically adjust compression, encoding, or decoding responsive to such metrics.

SUMMARY

The following is a non-exhaustive listing of some aspects of the present techniques. These and other aspects are described in the following disclosure.

Some aspects include a process, including: obtaining, with one or more processors, source video data, the source video data having a plurality of frames, the frames each having a plurality of pixel values; obtaining, with one or more processors, destination video data, the destination video data being a transformed version of the source video data and having transformed versions of the plurality of frames; for a given frame, accessing, with one or more processors, a given source frame among the plurality of frames in the source video data and a given destination frame among the plurality of frames in the destination video data, the given destination frame being a transformed version of the given source frame; segmenting, with one or more processors, the given source frame and the given destination frame into a plurality of blocks, each block corresponding to a region of pixels in the respective frame; for a plurality of blocks in the given source frame, determining, with one or more processors, a respective source aggregate value that is based on a measure of central tendency of pixel values in the respective block of the given source frame; for a plurality of blocks in the given destination frame, determining, with one or more processors, a respective destination aggregate value that is based on a measure of central tendency of pixel values in the respective block of the given destination frame; determining, with one or more processors, a plurality of differences between source aggregate values and corresponding destination aggregate values of the given frame; determining, with one or more processors, a frame aggregate value that is based on a measure of central tendency of the determined differences between source aggregate values and corresponding destination aggregate values of the given frame; determining, with one or more processors, a measure of distortion of the destination video data relative to the source video data based on the frame aggregate value and a plurality of other frame aggregate values of a plurality of other frames; and storing, with one or more processors, the measure of distortion in memory in association with the destination video data.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
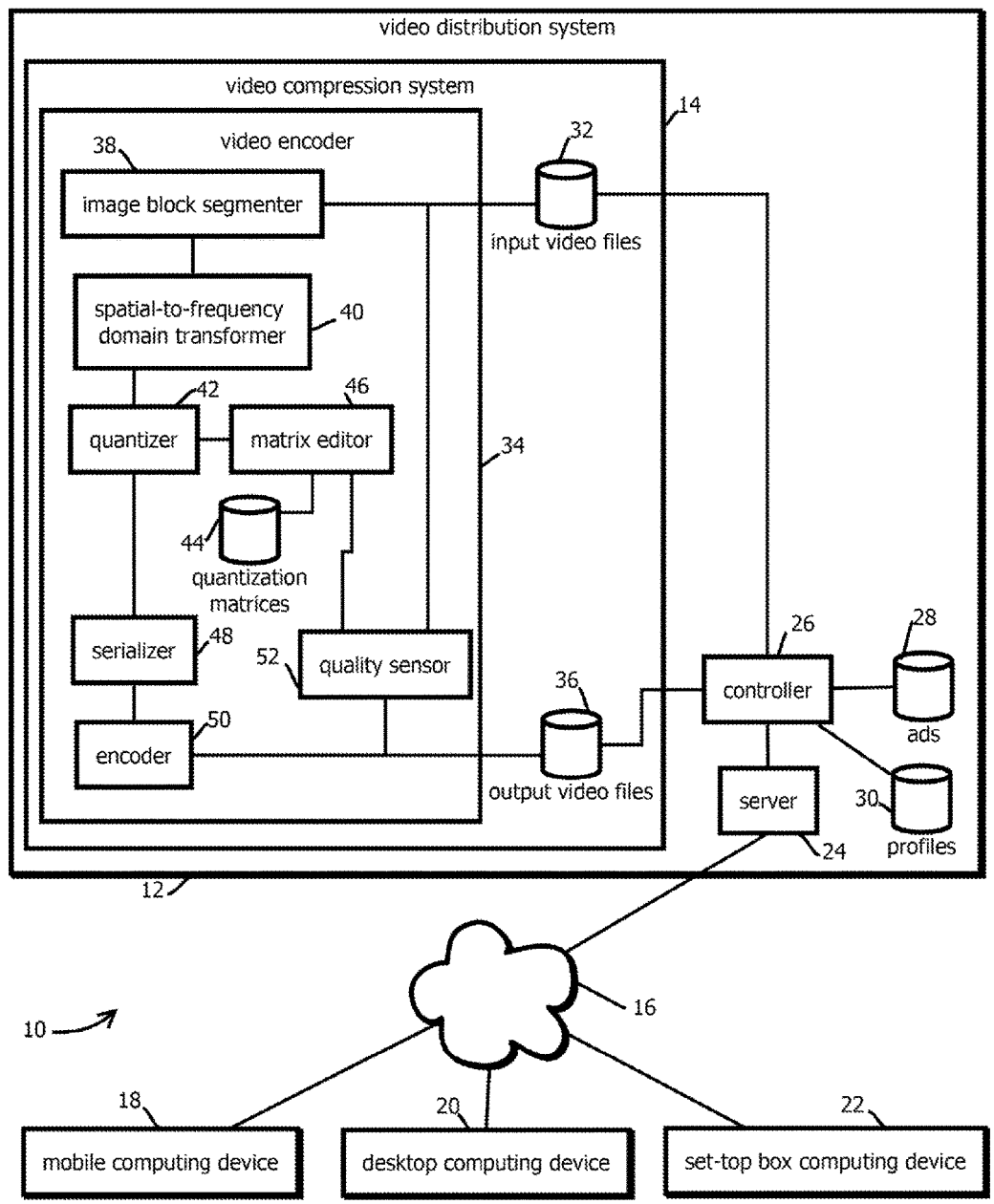
FIG. 1 shows an example of a video distribution system in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of data compression. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many image compression techniques used with video compression exhibit a "blocky" artifact, often at higher levels of compression. Often, smooth transitions between pixels in original images exhibit sudden changes at the edges of blocks in decompressed video. These and similar artifacts often serve as a constraint on the amount of compression that can be applied to a video file, causing excessive storage and network bandwidth use relative to what would be desirable with greater compression. Further, these artifacts often are distracting to users and can make it difficult to enjoy or extract information from compressed video and other content.

Some embodiments may mitigate these problems with a technique for measuring an amount of information loss in compression described below. Some embodiments may calculate a block-based measure of compression error, for instance, based on the below-described blocks of pixels. Some embodiments may calculate the measurement on eight-by-eight blocks of pixels (or other sizes noted below). An example of the technique is described in greater detail below in a series of steps and pseudocode. In some cases, the metric may be calculated and streaming video may be adjusted responsive to the metric. For example, some embodiments may adjust the various parameters described above for changing the compression parameters of a video stream or some embodiments may select between different resolutions, color bit depths, or frame rates in response to the calculated metric. In some cases, adjustments may be made on live streams or previously recorded and encoded streams.

Some embodiments may implement the following pseudocode process:

1. For each 8×8 block of pixels, a block average may be calculated as $$\text{avg\_block} = \frac{1}{64} \sum_{x=0}^{7} \sum_{y=0}^{7} pixel_{xy}$$

2. Repeat step 1 for the whole frame, and embodiments will get m*n blocks of block average and it is represented as $BAvg\_Frame = avg\_block_{m,n}$ 3. An example of a loss metric, referred to as a block peak signal to noise ratio (BPSNR) for the source and destination frame may be calculated as Block Mean Squared Error:

$$MSE = \frac{1}{xy} \sum_{x=0}^{x-1} \sum_{y=0}^{y-1} (\text{Source\_BAvg\_Frame}_{x,y} - \text{Destination\_BAvg\_Frame}_{x,y})^2$$

Block PSNR:

$$PSNR = 10 * \log_{10}\left(\frac{255 * 255}{MSE}\right)$$

It should be noted that:

Source_BAvg_Frame$_{x,y}$ is the source frame of block average

Destination_BAvg_Frame$_{x,y}$ is the destination frame of block average

For example, consider a 1080P frame, which has pixel width 1920 and height 1080. By doing the 8×8 block average, embodiments are expected to get Block average frame size of 240 by 135. (As: m=240 (1920/8) and n=135 (1080/8))

These metrics may be used to adjust various compression parameters, including both parameters provided by compression standards described below and other parameters relevant to an independently useful invention that may be used with our without the fast encoding loss metric. This other invention is described in another patent filing sharing portions of a disclosure with this filing, but the inventors reserve the right to claim combinations of features of these techniques. In particular, the inventors of the present application have observed that certain subsets of the information in images, for example, in a frame of video, are more important for avoiding these types of artifacts than other subsets of that information, relative to the balance that is typically struck in conventional video compression. In particular, when video images (e.g., frames) are transformed into the frequency domain from the spatial domain, certain lower-frequency components appear to contribute disproportionately to the blocky artifact when the video is decompressed and displayed.

Traditional video compression algorithms are not well-suited to exploit this insight. Typically, there is a fixed (and predetermined) set of parameter settings, called quantization matrices, that specify how much low-frequency and high-frequency information is retained during lossy compression. Thus, acting the above insight is not merely a matter of tuning existing algorithms, as the set of available balances are in a sense often "baked-in" to these algorithms.

Further complicating this issue is that it is desirable, and often commercially essential of a compression algorithm, for the existing installed base of video decoders to be able to decompress a bitstream of compressed video data. Typically, the installed base of decoders rely on the same predetermined discrete set of parameters used in compression, that is the same discrete set of quantization matrices. As a result, engineers are often dissuaded from deviating from this predetermined discrete set of quantization matrices, because if they used a custom quantization matrix, decoders generally will not have available that custom quantization matrix, as it is outside of the predetermined set, to decode video, limiting the audience and imposing burdens on those that wish to decode the video.

Some embodiments mitigate this problem by modifying some of the predetermined, discrete set of quantization matrices during compression, to decrease the amount of higher-frequency information that is retained, and then instructing decoders to use a different quantization matrix from that used to compress data to decode video bitstreams, while remaining standard compliant. As a result, for a given file size or bit rate, the above-described artifacts are expected to be reduced or eliminated, or for a given amount of artifacts being introduced, the file size are bit rate may be reduced, while remaining compliant with existing standards and decoders built to comply with those standards. That said, embodiments are not limited to systems that afford all of these benefits, as various tradeoffs are envisions, and independently useful techniques are described herein, none of which is to suggest that any other description is limiting.

Alternatively, or additionally, some embodiments modify certain transform matrix (e.g. DCT or ADST transform matrices) values to improve the effectiveness of compression, either dynamically as noted above, or by selecting fixed values once (or some embodiments may not modify transform matrix values, as some embodiments may only implement a subset of the techniques described herein, which is not to suggest that any other description is limiting). Some embodiments modify higher-frequency amplitudes to enhance compression rates at a given level of perceived quality, or improve perceived quality at a given compression rate. In many forms of DCT or ADST, a matrix is produced, with the first row and column value being a non-oscillating (DC) value, and the adjacent values being the primary oscillating (AC) components (e.g., at progressively higher frequencies further from the DC component along rows or columns of the matrix). These oscillating components are selectively modified, in some embodiments, by reducing their granularity or setting their values to zero to enhance entropy coding in subsequent steps. (Though one down-side of this approach is that data is discarded without regard to the amplitude of a value for a given frequency, so some patterns and textures in video data may be adversely affected, which is not to suggest that this or any other approach is disclaimed.) This approach is expected to be consistent with many existing, standard-compliant decoders, thereby avoiding the need for users to reconfigure their video players or install new software, while providing files and streaming video with relatively high-quality images at relatively low-bit rates.

Observed results significantly reduce the "blocky" artifact, without significantly impairing the effectiveness of compression. As a result, it is expected that a given bit-rate for transmission can deliver higher fidelity data, or a given level of fidelity can be delivered at a lower bit rate. For example, the present techniques may be used for improving video broadcasting (e.g., a broadcaster that desires to compress video before distributing via satellite, e.g., from 50 megabits per second (Mbps) to 7 Mbps, may use the technique to compress further at the same quality, or offer better quality at the same bit rate), improving online video streaming or video upload from mobile devices to the same ends. Some embodiments may support a service by which mobile devices are used for fast, on-the-fly video editing, e.g., a hosted service by which video files in the cloud can be edited with a mobile device to quickly compose a video about what the user is experience, e.g., at a basketball game.

In some embodiments, the techniques may be implemented in software (e.g., in a video or audio codec) or hardware (e.g., encoding accelerator circuits, such as those implemented with a field programmable gate array or an application specific integrated circuit (or subset of a larger system-on-a-chip ASIC)). The process may begin with obtaining data to be compressed (e.g., a file, such as a segment of a stream, including a sequence of video frames). Examples include a raw image file or a feed from a microphone (e.g., in mono or stereo). In some embodiments, setting these values to zero, or suppressing some values with modified quantization matrices, may increase the length of consecutive zeros after serialization of the matrix, thereby enhancing the compression techniques described herein, e.g., run-length coding or dictionary compression.

In some embodiments, different parameters described above may be selected based on whether a frame is an I-frame, a B-frame, or a P-frame (or, more generally, a reference frame or a frame described by reference to that reference frame). Some embodiments may selectively apply parameters above that produce higher quality compressed images on I-frames relative to the parameters applied to B-frames or P-frames. For instance, some embodiments may apply a higher-quality low-quality compression encoding, a higher threshold frequency for DCT matrix value injection, or a different threshold for injecting sub-block sizes for I-frames.

In some embodiments, the above techniques may be implemented in a computing environment 10 shown in FIG. 1. In some embodiments, the computing environment 10 includes a video distribution system 12 having a video compression system 14 in accordance with some embodiments of the present techniques. In some embodiments, the computing environment 10 is a distributed computing environment in which a plurality of computing devices communicate with one another via the Internet 16 and various other networks, such as cellular networks, wireless local area networks, and the like. In some embodiments, the video distribution system 12 is configured to distribute, for example, stream or download, video to mobile computing devices 18, desktop computing devices 20, and set-top box computing devices 22, or various other types of user computing devices, including wearable computing devices, in-dash automotive computing devices, seat-back video players on planes (or trains or busses), in-store kiosks, and the like.

Three user computing devices 18 through 22 are shown, but embodiments are consistent with substantially more, for example, more than 100, more than 10,000, or more than 1 million different user computing devices, in some cases, with several hundred or several thousand concurrent video viewing sessions, or more. In some embodiments, the computing devices 18 through 22 may be relatively bandwidth sensitive or memory constrained. To mitigate these challenges, in some cases, the video distribution system 12 may compress video, in some cases to a plurality of different rates of compression with a plurality of different levels of quality suitable for different bandwidth constraints. Some embodiments may select among these different versions to achieve a target bit rat, a target latency, a target bandwidth utilization, or based on feedback from the user device indicative of dropped frames. Alternatively, or additionally, in some embodiments, the video compression system 14 may be executed within one of the mobile computing devices 18, for example, to facilitate video compression before upload, for instance, on video captured with a camera of the mobile computing device 18, to be uploaded to the video distribution system 12.

The video may be any of a variety of different types of video, including user generated content, virtual reality formatted video, television shows (including 4k or 8K, high-dynamic range), movies, video of a video game rendered on a cloud-based graphical processing unit, and the like. The present techniques are described with reference to video, but some are applicable to a variety of other types of media, including audio.

In some embodiments, the video distribution system 12 includes a server 24 that may serve videos or receive uploaded videos, a controller 26 that may coordinate the operation of the other components of the video distribution system 14, an advertisement repository 28, and a user profile repository 30. In some embodiments, the controller 26 may be operative to direct the server 24 to stream compressed video content to one or more of the user computing devices 18 through 22, in some cases, dynamically selecting among different copies of different segments of a video file that has been compressed with different quality/compression-rate tradeoffs. The selection may be based on upon bit rate, bandwidth usage, packet loss, or the like, for example, targeting a target bit rate median value over a trailing or future duration of the video, in some cases, switching as needed at discrete intervals, for example, every two seconds, in response to a measured value exceeding a maximum or minimum delta from the target.

In some embodiments, the controller may be operative to recommend videos based upon user profiles in profile repository 30, and in some cases select advertisements based upon records in the advertisement repository 28. In some cases, the advertisements may be streamed before, during, or after a user-requested streamed video. Or in some cases, the video compression system 14 may have use cases in other environments, for example, in subscription supported video distribution systems that do not serve advertisements, and client-side computing devices, for example, in mobile computing device 18 to compress video before upload, in desktop computing device 20 to compress video feeds before wireless transmission to a wireless virtual reality headset, or the like. In some cases, the video compression system 14 may be executed within an Internet of things (IoT) appliance, such as a baby monitor or security camera, to compress video streaming before upload to a cloud-based video distribution system 12.

In some embodiments, each of the user computing devices 18 through 22 may include an operating system, and a video player, for example embedded within a web browser or native application. In some embodiments, the video player may include a video decoder, such as a video decoder compliant with various standards, like H.264, H.265, VP8, VP9, AOMedia Video 1 (AV1), Daala, or Thor. In some embodiments, an installation base of these video decoders may impose constraints upon the types of video compression that are commercially viable, as users are often unwilling to install new decoders until those decoders obtain wide acceptance. Some embodiments may modify existing standard-compliant compression algorithms in ways that afford even more efficient compression, while remaining standard compliant in the resulting output file, such that the existing installed base of various standard-compliant decoders may still decode and play the resulting files. (That said, embodiments are also consistent with non-standard-compliant bespoke compression techniques, which is not to imply that any other description is limiting.) Further, such compression may be achieved while offering greater quality in some traditional compression techniques, or while offering greater compression rates at a given level of quality.

In some embodiments, the video compression system 14 may include an input video file repository 32, a video encoder 34, and an output video file repository 36. In some embodiments, the video encoder may compress video files from the input video file repository 32 and store the compressed video files in the output video file repository 36. In some embodiments, a given single input video file may be stored in multiple copies, each copy having a different rate of compression in the output video file repository 36, and in some cases the controller 26 may select among these different copies dynamically during playback of a video file, for example, to target a set point bit rate (e.g., specified in user profiles). In some cases, the different segments of different copies may be associated with metadata indicating the identifier of the corresponding input video file, a position of the segment in a sequence of segments, and an identifier of the rate of compression or level of quality. In some cases, metadata in headers of video files may indicate parameters by which the videos encoded, which may be reference during decoding to select appropriate settings and stored values in the decoder, for example QP (quantization parameter) values that serve as identifiers for, or seed values for generating, quantization matrices. In some cases, the stored output video files may be segmented as well in time, for example, stored in two seconds or five second segments to facilitate switching, or in some cases, a single input video file may be stored as a single, and segmented, output video file, which is not to suggest that other descriptions are limiting. References to video files includes streaming video, for example, in cases in which the entire video is not resident on a single instance of storage media concurrently. References to video files also includes use cases in which an entire copy of a video is resident concurrently on a storage media, for example, stored in a directory of a filesystem or as a binary blob in a database on a solid-state drive or hard disk drive.

In some embodiments, the video encoder is an H.264, H.265, VP8, VP9, AOMedia Video 1 (AV1), Daala, or Thor video encoder having been modified in the manner indicated below to selectively adjust generally higher-frequency components of a transformation matrix in a way that causes those values to tend to be zero with a higher probability than traditional standard-compliant video encoding techniques. As a result, the modified transformation matrices are expected to produce relatively long strings of zeros relatively frequently, which are expected to facilitate more efficient compression, for example with entropy coding. And in some embodiments, the resulting file may remain compliant with corresponding decoders for H.264, H.265, VP8, VP9, AOMedia Video 1 (AV1), Daala, or Thor video. Further, these techniques are expected to be extensible to future generations of video encoders.

In some embodiments, the video encoder 34 includes an image block segmenter 38, a spatial-to-frequency domain transformer 40, a quantizer 42, a quantization matrix repository 44, a matrix editor 46, a serializer 48, a quality sensor 52, and an encoder 50. In some embodiments, the threshold selector 46 may be operative to select subsets of quantized transformation matrices and set values in the subsets to zero while leaving other, unselected subsets unmodified, or modified in a different way, for example, without setting values to zero, but quantizing the values more coarsely than other values in the matrix (e.g., quantizing values to the nearest even value, while other, lower-frequency values are quantized to the nearest integer).

In some embodiments, the image block segmenter 38 is configured to segment a frame of video (or a layer of a frame) into blocks. In some embodiments, different layers of a frame may be processed through the illustrated pipeline concurrently, for example, a chrominance layer or luminance layer. In some embodiments, the image block segmenter 38 may first segment a video frame into tiles of uniform and consistent size corresponding to one or more rows in one or more columns of the frame, and then each of those tiles may be segmented into one or more blocks, for example, blocks that are 4×4 pixels, 8×8 pixels, 16×16 pixels, 32×32 pixels, or 64×64 pixels, e.g., based on an amount of entropy in the segmented region, a compression quality setting, and an amount of movement between sequential frames. In some cases, block-sizes may be dynamically adjusted with the technique described in U.S. Provisional Patent Application 62/487,785, titled VIDEO ENCODING WITH ADAPTIVE RATE DISTORTION CONTROL BY SKIPPING BLOCKS OF A LOWER QUALITY VIDEO INTO A HIGHER QUALITY VIDEO, filed 20 Apr. 2017, the contents of which are incorporated by reference.

In some embodiments, different tiles and different portions of different tiles may be segmented into different sized blocks, for example based upon an amount of uniformity of image values (e.g. various attributes of pixels, like luminance, chrominance, red, blue, green, or the like) across the tile, with more uniformity corresponding to larger blocks. In some cases, thresholds for selecting the boxes may depend upon a compression rate or quality setting applied to the frame and the video, and in some cases, the compression rate or quality setting may vary between frames, for example, based on whether the frame is an I-frame, a P-frame, or a B-frame, with higher-quality, lower-compression rates being applied to I-frames. In some cases, higher-quality, lower-compression settings may be applied also based on amount of movement between consecutive frames, with more movement corresponding to lower-quality, higher-compression rate settings. The settings may affect each of the operations in the illustrated pipeline up to (and in some cases including) encoding and serialization, in some cases.

Next, some embodiments may input each of the blocks into the spatial-to-frequency domain transformer, 40. In some embodiments, the transformer is a discrete cosine transformer configured to produce a transformation matrix. In some embodiments, the transformer is an asymmetric discrete sine transformer also configured to produce an asymmetric discrete sine transform matrix. In some cases, the transform matrix may include a plurality of rows and a plurality of columns, for example, in a square matrix, and different values in the matrix may correspond to different frequency components of spatial variation in image values in the input block, for example, with a value in the first row and first column position corresponding to a DC value, a value in a first row and a second column corresponding to a first frequency of variation in a horizontal direction, and a value in a second column and the first row corresponding to a second frequency that is higher than the first frequency of variation in a horizontal direction, or vice versa, and so on, monotonically increases frequency across rows and columns of the transform matrix.

In some embodiments, blocks may be processed a block-modeler that approximates the block with a prediction, such as by approximating a block with a set of uniform values (e.g., an average of the values in the block) that are uniform over the block, or by approximating the block with a linear gradient of values, for instance, that linearly vary from left to right or top to bottom, or a combination thereof, according to horizontal and vertical coefficients. Some embodiments may then determine a residual value by calculating differences in corresponding pixel positions between these predicted values and the values in the block. Some embodiments may then perform subsequent operations based on these residual values and encode the prediction in a video bitstream such that the video may be decoded by re-creating the prediction and then summing the residual value for a given pixel position with the predicted value. In some cases, the predictions may be intra-frame predictions, such as predictions based upon adjacent blocks. In some cases, the predictions may be inter-frame predictions, such as predictions based upon subsequent or previous frames, for instance predictions based upon movement of items depicted in frames, like predictions based on segments of a video frame in a different position in a previous frame that are expected to move and a position of a given block being predicted, for instance, as a camera pans from left to right or an item moves through a frame.

In some embodiments, the transform matrix for each block may be input into the quantizer 42, which may quantize the transform matrix to produce a quantized transform matrix. In some cases, quantization may selectively suppress certain frequencies that are less likely to be perceived by a human viewer in the transform matrix or reduce an amount of resolution with which the frequencies are represented. In some embodiments, quantizing may be based upon a quantization matrix selected from the quantization matrices repository 44 and modified as described below. In some embodiments, a finite, discrete set of video encoding quality settings may each be associated with a different quantization matrix in the repository 44, and some embodiments may select a matrix based upon this setting. In some cases, a value for the setting may be stored in association with the block, the tile, or the frame, or the video file, for example in a header. In some embodiments, a similar quantization matrix repository like that corresponding element 44 may be stored in a decoder of the user computing devices 18 through 22, and those user computing devices may select the corresponding matrix when decoding video based upon the setting in the header. In some embodiments, the quantization matrices are specified by (e.g., calculated based on) a QP value stored in the header that ranges from 0 to 51, with 0 corresponding to lower compression rates and higher quality, and 51 corresponding to higher compression rates and lower quality (of human perceived images in compressed video, e.g., as determined by the metrics described below with reference to quality sensor 52).

In some embodiments, the quantizer 42 accesses (e.g., retrieves from memory or calculates) a matrix that is the same size as the transform matrix and performs an element-by-element division of the transform matrix by the quantization matrix, for example, dividing the value in the first row and first column by the corresponding value in the first row and first column, and so on throughout the matrices. In some embodiments, division may produce a set of quotients in place of each of the values of the transform matrix, and some embodiments may truncate less significant digits of the quotients, for example, less significant than a threshold, or rounding off to the nearest integer, for example, rounding up, rounding down, or rounding to the nearest integer. As a result, particularly large values in the quantization matrix at a given frequency position may tend to produce relatively small quotients, which may tend to be rounded to zero. Thus, in some cases, the quantization matrix may be tuned with relatively large values corresponding to positions that correspond to frequencies that are less perceptible to the human eye, which may cause the corresponding values in the quantized transform matrix to tend toward zero (discarding their information), unless the corresponding component in the transform matrix is particularly large and sufficient to overcome the division by the quantization matrix and produce a value that rounds to a nonzero integer.

In some embodiments, the matrix editor 46 may modify existing predetermined quantization matrices among a discrete set specified by a compression standard, in some cases dynamically responsive to feedback from a video file currently being compressed, such as from a stats file or from a single pass compression. In some embodiments, the matrix editor 46, in cooperation with the video encoder 34, may perform the operations of a process described below with reference to FIG. 2 to obtain and use these modified quantization matrices.

In some embodiments, the matrix editor 46 may select a base quantization matrix from which a modified quantization matrix is determined (or upon which it is based if previously formed). A base quantization matrix may be selected from among a predetermined discrete set of quantization matrices, such as those provided by various compression standards, like the compression standards mentioned herein. For example, the quantization matrix may be selected from among 52 quantization matrices provided for by the H.264 standard and specified by a quantization parameter, such as a QP value, that ranges between 0 and 51 and is expressed in a header of a compressed video bitstream. In another example, the quantization matrix may be selected from among those provided for in the H.265, VP8, VP9, AOMedia Video 1 (AV1), Daala, or Thor standards and is specified by a quantization parameter included other types of headers in the bitstream specified by the respective standard. In some cases, the base quantization matrix may be selected with traditional techniques for selecting a quantization matrix, for example, responsive to a configuration of the video encoder specifying a quantization parameter, responsive to a single pass target bit rate quantization parameter selection routine, responsive to a double pass quantization parameter selection routine that targets a bit rate or file size, or the like.

Some embodiments may use a modified form of the base quantization matrix to quantize each transform matrix from each block of at least some video data. In some cases, this may include dynamically forming the modified quantization matrix during video compression, or some embodiments may form this matrix by accessing a previously stored version of the modified matrix. In some cases, modification may include creating a new copy of the quantization matrix or overwriting values of an existing copy.

The modified quantization matrix (that is one modified relative to a predetermined discrete set of quantization matrices specified by a video compression standard in use by the video encoder 34 and identified in a bitstream produced by the video encoder 34) may be formed with a variety of different techniques. Some embodiments may merge two predetermined quantization matrices specified by a video encoding standard, for instance, merging element-by-element some values from a lower-image-quality (and higher-compression amount) quantization matrix into corresponding positions in a higher-image-quality (and lower-compression amount) quantization matrix, such as the base matrix. Thus, values in a given position in one matrix may replace values in that position in the other matrix, for instance, changing a value in a rightmost column, lowermost row in one matrix to be equal to a value in the same position in another matrix, and so on through a variety of different positions.

To this end, some embodiments may select a lower-image-quality quantization matrix (relative to the base quantization matrix) from which values are to be merged into the higher-quality base quantization matrix. In some embodiments, the selection may be of (and responsive to determining) a quantization matrix at a fixed rank-order distance along a ranking according to image quality of a discrete set of predetermined quantization matrices provided for by a compression standard, for example, selecting a next lower-image-quality quantization matrix, or skipping to a lower-image-quality quantization matrix that is two, five, or 10 quantization matrices in a lower-image-quality direction along the ranking.

In some embodiments, the amount of positions in this ranking that are "jumped" to select the lower-image-quality quantization matrix is dynamically adjusted, for example, in response to a score output by the quality sensor 52, in response to an amount of movement between frames, in response to a size of a block, in response to the ranking of the base quantization matrix, or a combination thereof, for example, a weighted combination that produces a score that is rounded to a next highest or lowest predetermined quantization matrix among a discrete set specified by a video compression standard, with some embodiments implementing logic to select a lowest-image-quality quantization matrix when the jump exceeds the predetermined range of discrete set of quantization matrices, for example, jumping beyond the 52nd one in the ranking in some standards.

Which values are merged into the base quantization matrix may be determined with a variety of different techniques. Some embodiments may merge values that correspond to spatial domain frequencies that exceed a threshold frequency, for example, merging values into the base quantization matrix from the selected lower-image-quality quantization matrix that are in positions of greater than a threshold row or greater than a threshold column, thereby preserving lower-frequency components of the base quantization matrix, while inserting higher-frequency components of the selected lower-image-quality quantization matrix. Or some embodiments may merge values based on scan position in a scan pattern used by the below-describe serializer 48, for example, merging in to the base quantization matrix values in positions corresponding to greater than a threshold scan position in the lower-image-quality quantization matrix that is selected.

Generally, the values inserted into the base quantization matrix are expected to be larger than the values that are replaced in the base quantization matrix. This is expected to increase the likelihood that information in the transform matrix at corresponding positions will be discarded, thereby increasing the likelihood of higher-frequency components being discarded during compression and increasing the amount of compression. To quantize the transform matrix, some embodiments may divide values in the transform matrix by values in corresponding positions in the modified quantization matrix (e.g., dividing the value in the first row and first column in one matrix by the value in the first row and first column and the other matrix, and so on with element-by-element divisions), and then round the resulting value to the nearest integer or rounding down. As a result, relatively large values in the quantization matrix may tend to cause values in the quantized version of the transform matrix to be set to zero, which is expected to enhance the effect of entropy coding by the encoder 50 described below.

Some embodiments may form the modified quantization matrix based on multiple lower-image-quality quantization matrices specified in a predetermined discrete set of a given standard. For instance, the base quantization matrix may be modified by inserting some values from a next-lower-image quality quantization matrix in the discrete set of a standard and other values from a, even lower quality matrix, for example, next in the ranking of quantization matrices in that set. In some cases, the insertion operations are configured such that the further along a ranking in a discrete set a selection is made to insert values, the higher the frequency of the position in the base quantization matrix the inserted values. In some embodiments, an insertion mapping matrix may specify "jumped" amounts that indicate how many positions to jump in an image-quality ranking of the discrete set to obtain an inserted value. An example is shown below, and as indicated, a first row, rightmost column may jump for positions relative to the base quantization matrix to obtain the inserted value, while the first row second-to-last column may jump three positions, and the first column first row position may retain the value of the base quantization matrix.

Example jump matrix specifying composition of a modified matrix from lower-image-quality quantization matrices a specified number of positions away in a quality ranking from a base quantization matrix:

[0, 1, 1, 3, 4]
[1, 1, 2, 3, 4]
[3, 3, 4, 4, 5]
[4, 4, 4, 5, 8]

In some cases, a similar matrix may specify an alphabet of symbols for rounding operations, e.g., indicating whether quotients are to be rounded to the nearest integer, nearest multiple of 2, nearest multiple of 4, 8, 16, or the like. After rounding quotients after element-by-element division of the transform matrix by the quantization matrix, these values may be accessed to determine where to round. In some cases, a DC component may be rounded to the nearest integer, while other components may be rounded to a nearest even number or a nearest (e.g., nearest smaller) multiple of 4 or 8, with larger frequencies having higher values (and thus, smaller alphabets).

In some embodiments, all of the values in the base quantization matrix may be modified to some degree, though the DC component may be modified by a smaller amount, for example, by less than 5%, less than 10%, or less than 20% of its original value in the discrete set of quantization matrices provided for by a standard. In some embodiments, values in the base quantization matrix may be modified according to a formula rather than according to other quantization matrices in a discrete set specified by a standard. For example, some embodiments may apply a function to each value or a subset of values in the base quantization matrix that includes as parameters the row and column position (or corresponding frequencies) of those values in the base quantization matrix. The function may also include as a parameter the value of that corresponding position in the base quantization matrix. In some embodiments, the function may output a modified value for the corresponding position in the modified quantization matrix. In some cases, the function may tend to (e.g., for more than 80 or 90% of values) increase values as frequencies increase, for example, tending to increase values as column position increases and tending to increase values as row position increases, thereby increasing the likelihood that higher-frequency components will be discarded during compression, unless those higher-frequency-components are particularly strongly exhibited in the original image or residual values. In some cases, the function may be a product of a scaling coefficient, a row position, a column position, and the value in the corresponding position in the base quantization matrix. Or in some cases, the function may scale nonlinearly, for example, applying a multiple to each value at greater than a threshold row or column position. Or in some cases, scan position in a scanning pattern used by the serializer 48 may serve the role of the row and column position in these techniques. In some cases, the multiple may be a square of the scan position multiplied by a scaling coefficient.

In some embodiments, the modified quantization matrix may be determined (for example selected among a plurality of previously calculated quantization matrices or dynamically formed) in response to various signals. In some embodiments, the modified quantization matrix may be changed between blocks within a tile of a frame (e.g. a row tile or a column tile, each containing a plurality of blocks, which in some cases which may be concurrently processed during encoding or decoding, such that two or more tiles are at least partially processed at that same time). In some cases, different modified quantization matrices (that are modified relative to a predetermined discrete set of quantization matrices provided for by a compression standard otherwise being applied) may be applied to different blocks within a segment of a frame (e.g., as specified in a bitstream to identify subsets of a frame (like a list of blocks) subject to similar parameters or the same parameters). In some cases, different modified quantization matrices may be applied to different blocks in different frames, for example, to the same block in the same position in different consecutive frames. In some cases, the selection of the modified quantization matrix may be made based on whether a frame is an I-frame, a B-frame, a P frame, or other type of frame that distinguishes between reference frames and frames that are described with reference to those reference frames.

In some embodiments, the amount of the above described jumps in rankings according to quality of discrete sets of quantization matrices specified by standards, or the above-describe scaling coefficients, may be determined based upon a feedback score, for instance, from the below-describe quality sensor 52. In some cases, these values by which quantization matrices are determined may be modulated to decrease an amount of difference between a target bit rate and a predicted or actual bit rate of compressed video produced by the encoder 50. In some cases, predictions may be produced by accessing a stats file determined during an initial pass through video to be compressed, such that forward-looking predictions may be made based on parameters, such as amounts of movement in video, amounts of entropy in images, and the like. In some cases, these values may be modulated to decrease an amount of difference between a predicted or currently exhibited file size of compressed video. In some cases, these values may be modulated to decrease an amount of difference between a predicted or currently exhibited target measure of difference between original images prior to compression in frames and decompressed versions of those images, for instance with peak signal to noise ratio or block peak signal-to-noise ratio scores like those described below. In some embodiments, values by which the modified quantization matrix is formed may be modulated in response to a score that is a combination of one or more of these types of feedback, such as a weighted sum of these different types of differences. Or in some cases, the score may be a nonlinear combination of these different types of distances between targets and measured values, for existence, measures of difference between images pre-and-post compression may dominate the score when those differences exceed some amount, for instance, based on a square of these differences or other higher-order contribution.

Some embodiments may further modify the quantized transform matrix to increase the amount of zero values in the quantized transform matrix in areas that are less perceptible to the human eye while having a relatively large effect on the rate of compression. Thus, some embodiments may set certain values to zero that the quantization matrix (which may be specified by a value and a header of a block, tile, layer, frame, or file), would not otherwise cause to be zero. In some cases, the highest-frequency values or higher-frequency values of the quantized transform matrix may be set to zero with the techniques described in U.S. Provisional Patent App. 62/513,681, titled MODIFYING COEFFICIENTS OF A TRANSFORM MATRIX, filed 1 Jun. 2017, which is incorporated by reference. This is expected to further enhance compression resulting from subsequent entropy coding operations, or some embodiments may omit this operation, which is not to suggest that any other operation or feature may not also be omitted.

In some embodiments, parameters may be dynamically adjusted, for example, within a frame, between frames, or between blocks or tiles responsive to feedback from a quality sensor 52. In some embodiments, the quality sensor 52 may be configured to compare the input video file to an output compressed video file (which includes a streaming portion thereof), in some cases decoding and encoded video files and performing a pixel-by pixel comparison, or a block-by-block comparison, and calculating an aggregate measure of difference, for example, a root mean square difference, mean absolute error, a signal-to-noise ratio, such as peak signal to noise ratio (PSNR) value, or a block-based signal to noise ratio, such as a BPSNR value as described in U.S. patent application 62/474,350, titled FAST ENCODING LOSS METRIC, filed 21 Mar. 2017, the contents of which are hereby incorporated by reference. For instance, some embodiments may increase the threshold frequency (moving the values set to zero to the right and down) in response to the BPSNR increases, e.g., dynamically while streaming or while encoding video, for instance between frames or during frames. In some embodiments, the quality sensor 52 may execute various algorithms to measure psychophysical attributes of the output compressed video file, for example, a mean observer score (MOS), and those specified in ITU-R Rec. BT.500-11 (ITUR, 1998) and ITU-T Rec. P.910 (ITU-T, 1999), like Double Stimulus Continuous Quality Scale (DSCQS), Single Stimulus Continuous Quality Evaluation (SSCQE), Absolute Category Rating (ACR), and Pair Comparison (PC). In some cases, video files may be compressed, measured, and re-compressed based on feedback, e.g., by interfacing a video terminal to the quality sensor 52 and providing a user interface by which human subjects enter values upon which the feedback is based, or some embodiments may simulate the input of human subjects, e.g., by training a deep coevolution neural network on a training set of pervious scores supplied by humans and the corresponding stimulus with a stochastic gradient descent or various other deep learning techniques.

In some embodiments, the parameters may be adjusted to target an output attribute of the compressed video file, such as a set point bit rate, for example, over a trailing duration of time, like an average bit rate over a trailing 20 seconds or 30 seconds. In some embodiments, the parameters described above may be adjusted along with a plurality of other attributes of the video encoding algorithm in concert to target such values. In some embodiments, the parameters described above may be adjusted based upon a weighted combination of the output of the quality sensor 52 indicative of quality of the compressed video and a target bit rate. For example, some embodiments may calculate a weighted sum of these values, and adjust the parameters described above in response to determining that the difference between the weighted sum and a target value exceeds a maximum or minimum. In some embodiments, proportional, proportional integrative, or proportional integrative derivative feedback control may be exercised over the threshold applied by the matrix editor 46 responsive to this weighted sum.

In some embodiments, the quantizer 42 outputs a quantized transform matrix where more of the values are zero relative to traditional techniques, and in some cases, some of the values have been reduced in their resolution, for example, transforming the values from a first alphabet having a first number of symbols to a second alphabet having a second number of symbols that is smaller than the first number of symbols, for example, using only even values or only odd values. As a result, the distribution of occurrences of particular symbols in the modified quantized transform matrix may be tuned to enhance the effectiveness of entropy encoding, where relatively frequent symbols are represented with smaller numbers of bits than less frequent symbols.

The quantized transform matrix may be input to the serializer 48, which may apply one of various scan patterns to convert the modified quantized transform matrix into a sequence of values, for instance, placing the values of the modified quantized transform matrix into an ordered list according to the scan pattern, e.g., loading the values to a first-in-first-out buffer that feeds the encoder 50.

For serialization, some embodiments may select a scan pattern that tends to increase the number of consecutive zeros in the resulting sequence of values to enhance the efficiency of entropy encoding by the encoder 50. In some embodiments, the scan pattern has a "Z" shape starting with a DC component, for example, in an upper-left corner of the quantized transform matrix and then moving diagonally back and forth across the quantized transform matrix, for example, from the second column-first row, to the first column-second row, and then to the first column-third row, then to the second column-second row, and then to the third column-first row, and so on, moving in diagonal lines back and forth, rastering diagonally across the quantized transform matrix from the DC value to in one corner to a value and an imposing corner.

In another example, the scan pattern may swing back and forth in a non-linear path through some back-and-fourth movements. For example, some diagonal swings back and or forth may only transit a portion of that diagonal, thereby imparting a curved-shaped to subsequent swings back or forth that remain adjacent to a previous diagonal scan back or forth across the quantized transform matrix. In some cases, these partial diagonal scans back or forth may be biased, for example, above or below the diagonal between the position of the DC component in the quantized transform matrix and the opposing corner. In some cases, a bias may be selected based upon a type of spatial-to-frequency domain transform performed, for example based upon whether a DCT transform is applied or an ADST is applied.

Next, some embodiments may compress the sequence of values produced by scanning according to the scan pattern with the encoder 50. In some embodiments, the encoder 50 is an entropy coder. In some embodiments, the encoder 50 is configured to apply Huffman coding, arithmetic coding, context adaptive binary arithmetic coding, range coding, or the like (which is not to suggest that this item of lists describes mutually exclusive designations or that any other list herein does, as some list items may be species of other list items). Some embodiments may determine the frequency with which various sequences these occur within the sequence of values and construct a Huffman tree according to the frequencies, or access a Huffman tree in memory formed based upon expected frequencies to convert relatively long, but frequent sequences in the sequence of values output by the serializer 48 into relatively short sequences of binary values, while converting relatively infrequent sequences of values output by the serializer 48 into longer sequences of binary values. In some embodiments, the decoder in the user computing devices 18 to 22 may access another copy of the Huffman tree to reverse the operation, traversing the Huffman tree based upon each value in the binary sequence output by the encoder 50 until reaching a leaf node, which may be mapped in the Huffman tree to a corresponding sequence of values output by the serializer 48. When decoding, the sequence of values may be de-serialized by reversing the scan pattern, de-quantized by performing a value-by-value multiplication with the quantization matrix designated in a header of the video file, and reversing the transform back to the spatial domain to reconstruct images in frames.

In some embodiments, the bitstream output by the encoder 50 may be stored in the output video file repository 36, in some cases combining different bitstreams corresponding to different layers of a frame and combining different frames together into a file format, and in some cases appending header information indicating how to decode the file.

The operation of the matrix editor 46 is described above as interfacing with the quantizer 42, but similar techniques may be applied elsewhere within the pipeline of video encoding implemented by the video encoder 34. For example, image blocks may be modified before being applied to the spatial-to-frequency domain transformer 40. Some embodiments may apply a low-pass or band-pass filter to variation in image values in the spatial domain, for example, horizontally, or vertically or a combination thereof, across the image block. For example, some embodiments may apply a convolution that sets each image value (e.g., a pixel value at a layer of a frame) to the mean of that image value, the image value to the left, and the image value to the right along a row; or the mean may be based on those image values left right, above, and below, or based on each adjacent pixel image value (or those within a threshold number of positions in the spatial domain) to implement an example of a low-pass filter applied before performing the spatial-to-frequency domain transform, thereby suppressing higher-frequency components.

In another example, the transform matrix may be modified by the matrix editor before being quantized by the quantizer 42, for example, setting values to zero in the manner described above or setting values to even or odd integer multiples of corresponding values and corresponding positions of the quantize station matrix to reduce the granularity of certain values. (Code may perform a division by-zero-check before dividing these values by the corresponding value in the quantization matrix and leave zero-values as zero to avoid division by zero errors.)

In another example, the matrix editor may operate upon the output of the serializer 48, for example, accessing the scan pattern to determine which values in a sequence of values are to be modified.

Figure 2:
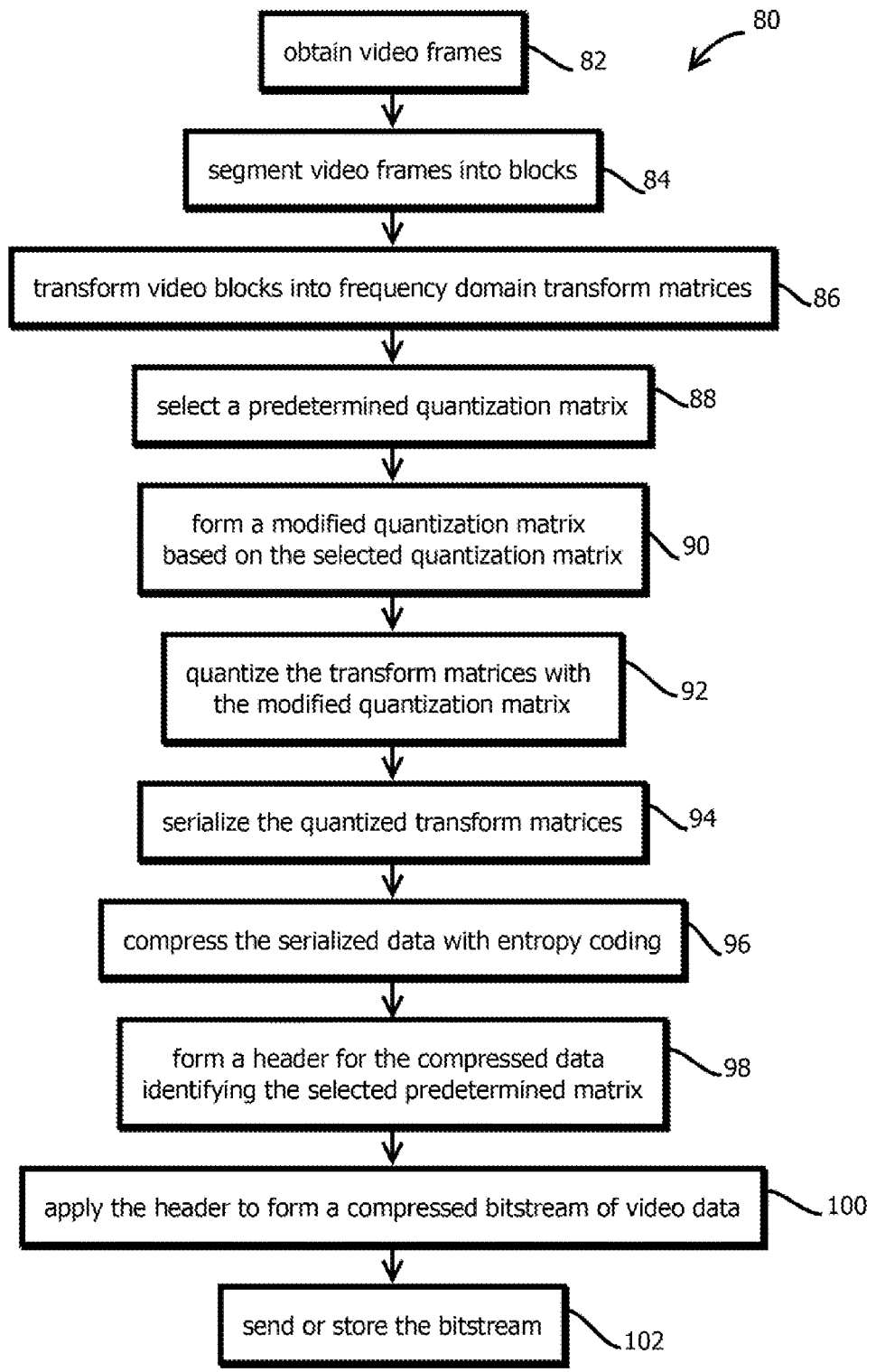
FIG. 2 shows an example of a video compression process in accordance with some embodiments.

FIG. 2 shows an example of a process 80 that may be implemented by the above-describe video encoder, but is not limited to embodiments having those features, which is not to suggest that any other description is limiting. In some embodiments, the operations by which the process 80 (and the other functionality described herein) is effectuated may be encoded as computer readable instructions stored in a tangible, non-transitory, machine-readable medium, such that when those instructions are executed by one or more processors, the operations described herein are effectuated. In some cases, some or all of the steps of the process 80 may be hardcoded into a hardware accelerator, such as a video encoder hardware accelerator application specific integrated circuit or a functional block of a processor or system-on-a-chip. In some embodiments, some of the operations of the process 80 may be omitted, replicated, executed in a different order, executed concurrently, or otherwise varied, which is not to suggest that any other description is limiting.

In some embodiments, the process 80 begins with obtaining video frames, as indicated by block 82, and then segmenting video frames into blocks, as indicated by block 84. In some embodiments, the process 84, further includes transforming video blocks into frequency domain transform matrices, as indicated by block 86. In some cases, this may further include performing the above-described operations by which predictions of blocks are determined, residuals are calculated, and those residuals may be subject to the transformation of block 86, rather than the original pixel values (though it should be noted that residuals are a type of pixel value).

Next, some embodiments may select a predetermined quantization matrix, as indicated by block 88, and form a modified quantization matrix based on the selected quantization matrix, as indicated by block 90. Some embodiments may then quantize the transform matrices with the modified quantization matrix, as indicated by block 92.

Some embodiments may then serialized the quantized transform matrices, as indicated by block 94, and compress the serialized data with entropy coding, as indicated by block 96. Some embodiments may then form a header for the compressed data identifying the selected predetermined matrix, as indicated catered by block 98. In some cases, headers may be compressed or uncompressed portions of a video bitstream. In some cases, the header may be associated with, for example, serve as a prefix in a bitstream of, a compressed portion of data containing data to which the header applies. In some cases, the header may include various parameters by which a decoder may reverse some or all of the above-described operations to re-create frames (which includes re-creating approximations thereof when using lossy compression algorithms) to decode and display compressed video. In some cases, the headers include a parameter that identifies a quantization matrix purported to (according to the standard and header values) have been used during compression. And in some cases, decoders on a client computing device may playback video by accessing the identified quantization matrix to reverse the above-described quantization operations (to the extent possible, as some information may be discarded during the quantization process). In some cases, the quantization parameter may identify one of the quantization matrices in a discrete set specified by a given standard, which may also be identified in the bitstream. For instance, a quantization parameter may be a value from 0 to 51 that identifies one of a discrete set of 52 quantization matrices that vary in tradeoffs between image-quality and compression amounts.

As a result of the above described modifications to the quantization matrix that is identified in the header, which may be the base quantization matrix, the decoder may be instructed by the header to use a different quantization matrix to decode a given block than was used to encode that block. For instance, a decoder may use the base quantization matrix to decode a given block, while the given block was encoded with a modified version of that base quantization matrix, e.g., where some higher-frequency component values are different (such as larger) from that used by the decoder. As a result, in some cases, the block of data may be compressed by a greater amount than is provided for by the base quantization matrix due to the insertion of values described above, while the lower-frequency components of information may be retained, and the standard-compliant decoder may have information sufficient to process and decode and play the compressed data.

Some embodiments may apply the header to form a compressed bitstream of video data, as indicated by block 100, and then send or store the bitstream, as indicated by block 102. In some cases, sending the bitstream may include streaming the bitstream to one or more of the above described computing devices 18, 20, or 22. Streaming may include determining whether user credentials associated with those devices are associated with valid subscriptions, or may include selecting one or more advertisements to be sent to the user computing devices 18, 20, or 22 for presentation to users in association with the streamed video, for instance, before or after the streamed video.

In some cases, different versions (at different compression rates) of a file may be processes concurrently, temporal segments of a video file may be processed concurrently, frames may be processed concurrently, different tiles may be processed concurrently, different blocks may be processed concurrently, or different layers within a frame may be processed concurrently, or combination thereof.

Figure 3:
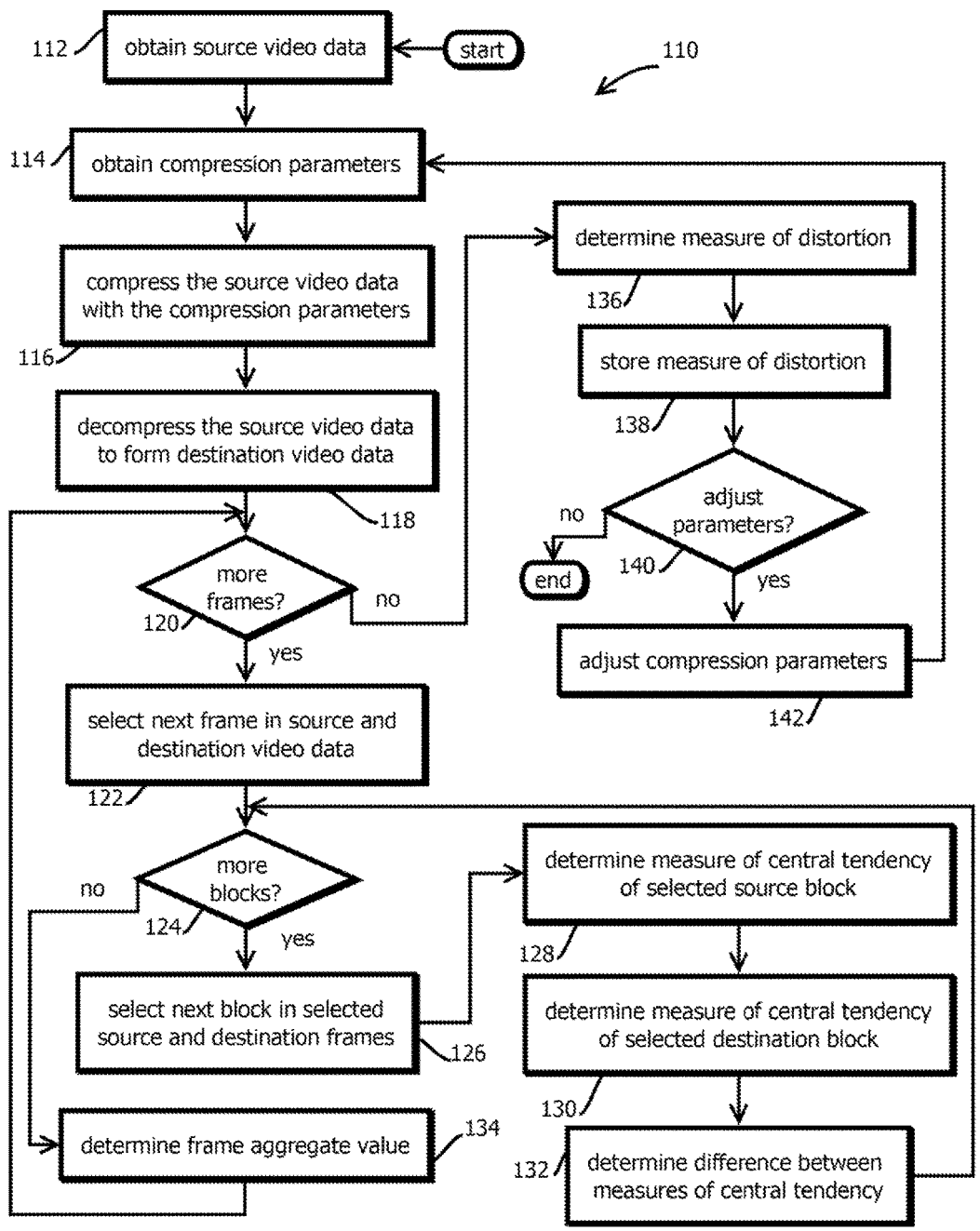
FIG. 3 shows an example of a distortion measurement process that may serve as feedback for the above processes in accordance with some embodiments.

FIG. 3 shows an example of a process 110 that may be executed by some embodiments of the above-described video compression system 14, for example, by the above-described quality sensor 52 in cooperation with other described components. The process 110, in some embodiments, may provide a relatively low latency encoding loss metric. This metric, in some cases, may serve as feedback that may be used by some embodiments to adjust some of the above-described parameters of image compression, for example, to target a particular loss metric, to ensure a particular loss metric remains below some threshold, or to target some combination, such as a weighted sum, of a loss metric and various other metrics, such as a bit rate or file size. In some embodiments, traditional parameter adjustments to compression standards may be implemented responsive to the loss metric, for example, adjusting the above-described QP value or otherwise selecting among a discrete set of quantization matrices specified by a quantization parameter of a compression standard. Similar adjustments may be made to parameters by which block sizes are determined or inter-or-intra-frame predictions are determined. Or some embodiments may determine the loss metric without using resulting values as feedback to adjust compression parameters, e.g., by displaying the metric to a user in a user interface that visually associates the loss metric with a measured file, which is not to suggest that any other description herein is limiting.

In some embodiments, the process 110 may begin with obtaining source video data, as indicated by block 112. In some embodiments, the source video data may include the video data ingested by the above-described video encoder 34, for example, the input video files 32. In some embodiments, source video may be obtained upon initiating a process to compress the source video or perform some other transformation, such as rescaling the source video to a different display size (e.g. a different number of horizontal or vertical pixels, like from 4K to 1080p) or adjusting a color space of the source video file or color encoding (like transitions to or from a high-dynamic range format).

Next, some embodiments may obtain compression parameters, as indicated by block 114. In some cases, the compression parameters may be any of the above-describe parameters by which compression may be configured (e.g., threshold frequencies, jumps in rankings of quantization matrices, symbol set size for encoding, etc.). Compression parameters further include parameter specified in a compression standard in use, such as the various compression standards described above. In some embodiments, a plurality of compression parameters may be obtained.

Next, some embodiments may compress the source video data with the compression parameters, as indicated by block 116. In some embodiments, this may include performing the operations of FIG. 2 and engaging corresponding portions of the video encoder 14 described above. In some embodiments, compressing the source video data may include compressing the source video data with unaltered versions of the above-described compression standards, e.g., without editing standard-provided quantization matrices.

Some embodiments may then decompress the source video data to form destination video data, as indicated by block 118. In some embodiments, the quality sensor 52 described above may include a video decoder corresponding to the video encoder 34, which may be configured to reverse the operations of the video encoder 34 to produce decompressed video having decompressed frames. The decoding process may include reversing the above-described entropy coding, deserializing the resulting sequences according to a reversed scan pattern into quantized transform matrices, identifying a quantization matrix according to a header of the bitstream, and multiplying values of the identified quantization matrix by corresponding values of the quantized transform matrices in an element-by-element multiplication. In some embodiments, the resulting frequency domain transform matrix may then be transformed back into the spatial domain by reversing the above-described frequency domain transformations. A resulting spatial domain matrix may then be combined with other spatial domain matrices to form a portion of a frame, such as a portion of a frame specifying a particular color or luminance. In some embodiments, the spatial domain values may be residuals from a prediction (like an inter-frame prediction or intra-frame prediction), and some embodiments may determine the prediction from the bitstream and combined predictive values with residual values to form the displayed video data (that is data prepared for display, which does not necessarily require that an image be rendered, and which not should not be read to suggest that any other description is limiting).

In some embodiments, decompressing the source video data may produce a set of destination frames, each destination frame corresponding to one of the source frames. In some embodiments, each of the destination frames may be the same size as the source frames. In some embodiments, the resulting frames in the destination data and the source data may be segmented, in some cases by referencing segmentation corresponding to blocks defined during compression, or in some cases, by segmenting the frames according to an independent tiling process. Some embodiments make segment frames into rectangles, such as squares, having sides that range from 4×4 pixels in the horizontal and vertical direction of the display space, respectively, to squares having sides of 128×128 pixels in the horizontal and vertical direction, respectively. In some cases, the frames may be segmented into blocks that are not squares, for example, rectangles having longer horizontal sides than vertical sides. In some cases, frames may be segmented into other unit tiles, such as according to a hexagonal grid. In some embodiments, blocks in the frames may be sized based upon an entropy of pixel values within the block, for example, such that a variance of entropy among blocks is minimized or reduced relative to a regular tiling of uniform block size, and more uniform regions of a frame receive larger blocks while more detailed regions receive smaller blocks.

Next, some embodiments may compare the decompressed destination video data to the source video data to determine a loss metric, such as the below-described measure of distortion or the below-described frame aggregate values individually. In some embodiments, these metrics may be calculated based upon a sampling of the video data. For example, some embodiments may sample frames, for example, performing the calculations only on I-frames or other reference frames, or performing the calculations on even frames or odd frames. Some embodiments may sample blocks within frames, for example even-numbered blocks or odd number blocks or randomly selected blocks. Some embodiments may sample more or less than 10%, 20%, or 50% of the available data. Some embodiments may sample different types of pixel values differently, e.g., sampling luminance more heavily that the color red.

Some embodiments may calculate the below-described metrics for different types of pixel values and form a combined metric based on the combination of metrics calculated for the different types of pixel values, such as loss metrics for each of three primary colors and a loss metric for a luminance type pixel value. In some embodiments, these different types of loss metrics may be combined in an aggregate value in a weighted sum, with the weights in some cases that are unequal in favor different types of pixel values. In some cases, a luminance pixel value or a blue pixel value may have a greater weight in the weighted sum than a red or green pixel value, for example 10% more, 20% more, 50% more, or 200% more.

In some embodiments, the process 110 includes repeating one or more of the below described nested loops. In some embodiments, some or all of these loops may be executed concurrently on different portions of the source and destination video data, for instance, processing different frames concurrently to expedite operations, in some cases in different threads on a given computing device, or on different computing devices.

In some embodiments, the process 110 includes determining whether there are more frames to process, as indicated by block 120. Some embodiments may access a current frame in program state or default to a first frame and access a next sequential frame in the source and destination video data to determine whether there are more frames to process. Upon determining that there are more frames to process, some embodiments may select a next frame in a sequence specified in the source and destination video data, as indicated by block 122, which in some cases may include jumping to a next frame according to a sampling pattern, like a next even-numbered frame, next odd-numbered frame, a next I-frame, a next reference frame, or the like.

Next, some embodiments may determine whether there are more blocks to process within a current selected frame, as indicated by block 124. Some embodiments may access a current block being processed in program state and identify a next block according to a frame scanning pattern that specifies an order with which blocks are processed, for example, rastering across a frame with a pattern that increments downward upon each horizontal pass. Upon determining that there are more blocks to process, some embodiments may select a next block in the selected source and destination frames, as indicated by block 126. In some embodiments, selecting the next block may include selecting a next block according to a sampling pattern like those described above, e.g., an even numbered block or a random block.

Next, some embodiments may compare the selected block from the source and destination frames, which may correspond to one another, with the destination frame being a transformed version of the source frame. In some cases, the transformation is a lossy compression and then decompression transformation by which the source frame is transformed into the selected destination frame. Or in some cases, other types of transformations may be performed, such as transformations from between different video codecs, transformations between video sizes, transformations between color spaces, and the like.

In some embodiments, the comparison may include determining a measure of central tendency of the selected source block, as indicated by block 128. In some cases, the measure of central tendency may be a mean, a mode, or a median. In some embodiments, the measure of central tendency may be a measure of central tendency of a particular type of pixel value, such as a luminance pixel value, a red pixel value, a blue pixel value, a green pixel value, or the like. In some embodiments, the above-noted comparison may be performed for each type of pixel value. In some embodiments, the different pixel values may drive the intensity of one or more sub elements of a pixel when rendering a frame on a display. Thus, for example, some embodiments may determine for each luminance intensity value in a block of source video data of a source frame, an average luminance.

Next, some embodiments may determine a measure of central tendency of the selected destination block, as indicated by block 130. In some cases, this may be the same calculation as is performed in block 128, except on corresponding values in the destination frame, for instance in values in the same position, of the same type of pixel value. In some embodiments, blocks in the source and destination frames may be coterminous, in the same positions horizontally and vertically in the frames, and having the same spatial dimensions.

Some embodiments may then determine a difference between the measures of central tendency, as indicated by block 132. In some cases, this may include subtracting a mean value of the selected source block from a mean value of the selected destination block, or vice versa. Some embodiments may determine an absolute value of the resulting difference or square (or higher even power) of the resulting difference.

Some embodiments may then return to block 124 and determine whether there are more blocks to process. Upon determining that there are no more blocks to process, some embodiments may proceed to block 134 and determine a frame aggregate value. In some embodiments, the frame aggregate value is the above-described block mean square error. For example, some embodiments may determine the square of each of the differences determined at block 132 within a frame for a type of pixel value and sum these squares for a frame for a pixel value type. Some embodiments may then divide the sum of squares by a number of blocks within the frame (or a number sampled) to determine a mean squared error. In some embodiments, the frame aggregate value is a different kind a measure of central tendency of the differences, such as a mode or median of the differences or squares of the differences. In some embodiments, a plurality of aggregate values may be determined for each frame, such as for each type of pixel value.

In some embodiments, the described adjustments to compression parameters may be performed on a frame-by-frame basis, based (e.g., only or in part) upon frame aggregate values for a frame to which the adjustments are applied, according to the techniques described below, or some embodiments may aggregate values across frames, such as with a moving measure of central tendency, like a moving average, mode, or median value, or a moving measure of variations (like a max, a standard deviation, or a variance) and make adjustments responsive to these values, or some embodiments may determine a measure of central tendency or variation of frame aggregate values across all frames.

Some embodiments may proceed to determine whether there are more frames to process, as shown in block 120. Upon determining that there are no more frames to process, some embodiments may determine a measure of distortion for a plurality of frames, as indicated by block 136. In some embodiments, the measure of distortion may be a measure of central tendency of the frame aggregate values, a measure of central tendency of a weighted combination of frame aggregate values for different types of pixels values, or a measure of variance of one of these quantities, such as a max and min value range, a max value, a standard deviation, a variance, or the like. In some embodiments, the plurality of frames includes a threshold number of sequentially consecutive frames, such as a trailing or leading threshold number of frames, like to frames, five frames, 10 frames, 30 frames, or the like. In some embodiments, the measure of distortion is based upon each of the frames and a video or each sampled frame. In some embodiments, values based on a plurality of frames may weight frames differently, like in a weighted average, e.g., by more heavily weighting reference frames, or down-weighting frames with relatively more movement depicted than other frames.

Some embodiments may store the measure of distortion, as indicated in block 138, for example in program state in random-access memory, or in persistent storage, such as in a stats file. In some embodiments, a stats file in a dual-pass compression algorithm configuration may be formed with a plurality of measures of distortions corresponding to different portions of the video, such as frames, in a sequence of frames and a video file, and some embodiments may adjust compression parameters in a second pass to the video file based upon measures of distortions corresponding to portions of the video file being compressed.

Some embodiments may determine whether to adjust parameters, as indicated by block 140. In some embodiments, the determination may be based on, such as in response to, a determination of whether the measure of distortion or an individual frame aggregate value exceeds a threshold, in which case some embodiments may adjust compression parameters to reduce an amount of data loss. In some embodiments, the determination may be based both on the measure of distortion and a bit rate or target file size, such as a weighted combination, or in response to determining that an amount of space afforded by a target bit rate or file size permits an adjustment to compression parameters to make compression less lossy. In some embodiments, a target bit rate may be based upon a threshold number of consecutive frames, such as a threshold number of consecutive frames within a trailing duration of two seconds or five seconds. Some embodiments may predict whether an adjustment to compression parameters will cause the target bit rate to be exceeded and further adjust compression parameters until the target bit rate is not exceeded or matched. Some embodiments may iteratively adjust compression parameters to be less lossy (and less effective in compressing data) until the target bit rate is determined to be met or exceeded, in some cases backing off by one iteration upon the target bit rate being exceeded.

In some embodiments, upon determining to not adjust parameters, for instance because a target file size is going to otherwise be exceeded, some embodiments may terminate the process. Alternatively, upon determining to adjust parameters, some embodiments may perform the adjustment, as indicated by block 142. In some embodiments, the adjustment may include adjusting a threshold frequency in quantization at which values are taken from a lower-quality quantization matrix for insertion into a base quantization matrix, or a threshold frequency at which values in a transform matrix greater than the threshold frequency are set to zero. In some embodiments, the adjustment may include adjusting a threshold scan position after which values are set to zero or after which different quantization matrix parameters are used. In some embodiments, the adjustment may be a size of a jump in a ranking of quantization matrices to identify a quantization matrix to insert higher-frequency components into the base quantization matrix as described above. In some embodiments, the adjustment is to change a base quantization matrix, for instance, in a direction that tends to retain more data in compression, for instance, selecting a different quantization matrix among a set of 52 quantization matrices provided for by a compression standard, e.g., by incrementing a QP value. In some embodiments, the adjustment is to a combination of these parameters. In some embodiments, the adjustment is to a block size of blocks formed when segmenting blocks during compression, for example, to decrease a block size upon which transformation matrices are determined.

As a result, some embodiments may dynamically adjust compression parameters responsive to a relatively low latency loss metric, which is expected to be applicable to even relatively high-data rate standards, such as 4K or 8K video, like high dynamic range video.

Figure 4:
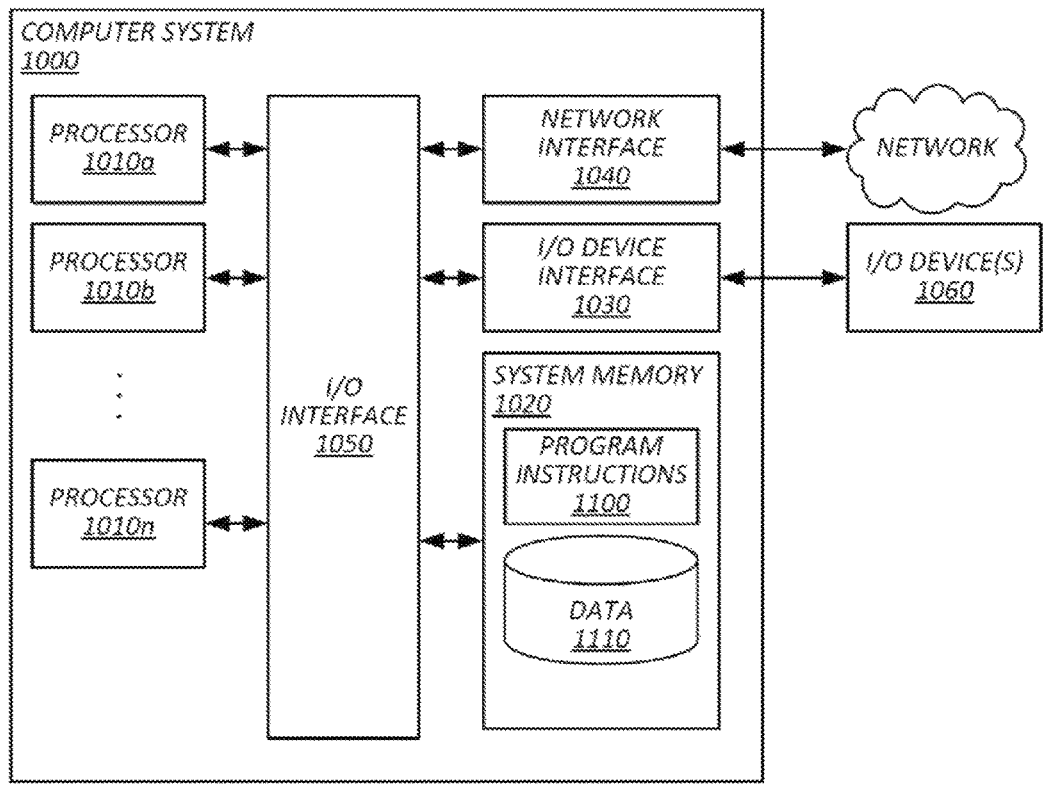
FIG. 4 shows an example of a computer system by which the above processes and systems may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: obtaining, with one or more processors, source video data, the source video data having a plurality of frames, the frames each having a plurality of pixel values; obtaining, with one or more processors, destination video data, the destination video data being a transformed version of the source video data and having transformed versions of the plurality of frames; for a given frame, accessing, with one or more processors, a given source frame among the plurality of frames in the source video data and a given destination frame among the plurality of frames in the destination video data, the given destination frame being a transformed version of the given source frame; segmenting, with one or more processors, the given source frame and the given destination frame into a plurality of blocks, each block corresponding to a region of pixels in the respective frame; for a plurality of blocks in the given source frame, determining, with one or more processors, a respective source aggregate value that is based on a measure of central tendency of pixel values in the respective block of the given source frame; for a plurality of blocks in the given destination frame, determining, with one or more processors, a respective destination aggregate value that is based on a measure of central tendency of pixel values in the respective block of the given destination frame; determining, with one or more processors, a plurality of differences between source aggregate values and corresponding destination aggregate values of the given frame; determining, with one or more processors, a frame aggregate value that is based on a measure of central tendency of the determined differences between source aggregate values and corresponding destination aggregate values of the given frame; determining, with one or more processors, a measure of distortion of the destination video data relative to the source video data based on the frame aggregate value and a plurality of other frame aggregate values of a plurality of other frames; and storing, with one or more processors, the measure of distortion in memory in association with the destination video data.

2. The medium of embodiment 1, wherein: blocks in the source frame have coterminous perimeter pixel positions with corresponding blocks in the destination frame; the plurality of blocks are each rectangular regions of pixels; sizes of the blocks are between 4 by 4 pixels in horizontal and vertical directions, respectively, of the given frame and 128 by 128 pixels in the horizontal and vertical directions, respectively, of the given frame; the frame aggregate value is formed with steps for determining a frame aggregate value; the destination video data is formed with steps for compressing video data; the operations comprise steps for adjusting compression parameters in response to a video quality measurement; the frame aggregate value is based on a mean square error of the plurality of differences between source aggregate values and corresponding destination aggregate values of the given frame; and each frame has more than or equal to 3840 pixel positions along more than or equal to 2160 lines.

3. The medium of any one of embodiments 1-2, wherein: the source aggregate value is based on a mean of pixel values in the respective block in the source frame; and the destination aggregate value is based on a mean of pixel values in the respective block in the destination frame.

4. The medium of any one of embodiments 1-2, wherein: at least one of the measures of aggregate value is a mean, median, or mode.

5. The medium of any one of embodiments 1-2, wherein: each of the measures of aggregate value is the same type of measure and is one of a mean, median, or mode.

6. The method of any one of embodiments 1-5, wherein: the frame aggregate value is based on each and every block in the given source frame and the given destination frame.

7. The medium of any one of embodiments 1-5, wherein: the measure of distortion is based on a sampling, wherein the sampling is of: pixels in blocks and does not include all pixels of the sampled blocks, blocks in the plurality of frames and does not include all blocks in the plurality of frames, frames and does not include all of the plurality of frames, or a combination thereof.

8. The medium of any one of embodiments 1-7, wherein: each of the plurality of blocks in the given source frame and in the given destination frame is the same size and does not overlap other blocks in the same frame.

9. The medium of any one of embodiments 1-28, wherein: for the given frame, a plurality of different frame aggregate values are determined for a plurality of different types of pixel values corresponding to different color or luminance constituents of an image depicted in the given frame; and the measure of distortion is based on the plurality of different frame aggregate values.

10. The medium of embodiment 9, wherein: different weights are associated with the different types of pixel values; and the measure of distortion is based on a weighted combination of the plurality of different frame aggregate values in which different frame aggregate values are multiplied by their respective corresponding one of the different weights.

11. The medium of embodiment 10, wherein: a weight associated with pixel values indicating luminance is greater than a weight associated with pixel values indicating a constituent color.

12. The medium of any one of embodiments 1-11, wherein: the measure of distortion is a mean of a plurality of frame aggregate values.

13. The medium of any one of embodiments 1-12, wherein: the measure of distortion is a moving mean of a plurality of frame aggregate values of a threshold number of sequential frames in the video data.

14. The medium of any one of embodiments 1-13, the operations comprising: concurrently determining a plurality of differences between source aggregate values and corresponding destination aggregate values.

15. The medium of any one of embodiments 1-14, wherein: the pixel values are residual values indicative of differences between an intra-frame prediction of blocks or inter-frame prediction of blocks and displayed pixel values.

16. The medium of any one of embodiments 1-15, the operations comprising: determining an aggregate amount of data discarded when rounding quotients formed with an element-by-element division of a transform matrix by a quantization matrix; and storing the aggregate amount of data discarded in association with the destination video data.

17. The medium of any one of embodiments 1-16, the operations comprising: forming the destination video data by encoding in a compressed bitstream the source video data with lossy compression and then decoding the compressed bitstream.

18. The medium of embodiment 17, the operations comprising: adjusting the quantization matrix used in encoding the compressed bitstream or encoding a new compressed bitstream representation of the source video data in response to the measure of distortion.

19. The medium of embodiment 17, the operations comprising: adjusting values of a transform matrix formed when encoding the compressed bitstream or encoding a new compressed bitstream representation of the source video data in response to the measure of distortion.

20. The medium of any one of embodiments 1-19, the operations comprising: receiving a request for video content from a client computing device; accessing a library of video content; sending the compressed video bitstream to the client computing device; and one or more of: determining that the client computing device is associated with a subscription; or sending an advertisement to the client computing device for display.

21. A method comprising: the operations of any one of embodiments 1-20.

22. A system, comprising: one or more processors; and memory storing instructions that when executed by the processors cause the processors to effectuate operations comprising: the operations of any one of embodiments 1-20.

What is claimed is:

1. A tangible, non-transitory, machine-readable medium storing instructions that when executed by one or more processors effectuate operations comprising:
    obtaining, with one or more processors, source video data, the source video data having a plurality of frames, the frames each having a plurality of pixel values;
    obtaining, with one or more processors, destination video data, the destination video data being a transformed version of the source video data and having transformed versions of the plurality of frames;
    for a given frame, accessing, with one or more processors, a given source frame among the plurality of frames in the source video data and a given destination frame among the plurality of frames in the destination video data, the given destination frame being a transformed version of the given source frame;
    segmenting, with one or more processors, the given source frame and the given destination frame into a plurality of blocks, each block corresponding to a region of pixels in the respective frame;
    for a plurality of blocks in the given source frame, determining, with one or more processors, a respective source aggregate value that is based on a measure of central tendency of pixel values in the respective block of the given source frame;
    for a plurality of blocks in the given destination frame, determining, with one or more processors, a respective destination aggregate value that is based on a measure of central tendency of pixel values in the respective block of the given destination frame;
    determining, with one or more processors, a plurality of differences between source aggregate values and corresponding destination aggregate values of the given frame;
    determining, with one or more processors, a frame aggregate value that is based on a measure of central tendency of the determined differences between source aggregate values and corresponding destination aggregate values of the given frame;
    determining, with one or more processors, a measure of distortion of the destination video data relative to the source video data based on the frame aggregate value and a plurality of other frame aggregate values of a plurality of other frames; and
    storing, with one or more processors, the measure of distortion in memory in association with the destination video data.

2. The medium of claim 1, wherein:
    blocks in the source frame have coterminous perimeter pixel positions with corresponding blocks in the destination frame;
    the plurality of blocks are each rectangular regions of pixels;
    sizes of the blocks are between 4 by 4 pixels in horizontal and vertical directions, respectively, of the given frame and 128 by 128 pixels in the horizontal and vertical directions, respectively, of the given frame;
    the frame aggregate value is formed with steps for determining a frame aggregate value;

the destination video data is formed with steps for compressing video data;
the operations comprise steps for adjusting compression parameters in response to a video quality measurement;
the frame aggregate value is based on a mean square error of the plurality of differences between source aggregate values and corresponding destination aggregate values of the given frame; and
each frame has more than or equal to 3840 pixel positions along more than or equal to 2160 lines.

3. The medium of claim 1, wherein:
the source aggregate value is based on a mean of pixel values in the respective block in the source frame; and
the destination aggregate value is based on a mean of pixel values in the respective block in the destination frame.

4. The medium of claim 1, wherein:
at least one of the measures of aggregate value is a mean, median, or mode.

5. The medium of claim 1, wherein:
each of the measures of aggregate value is the same type of measure and is one of a mean, median, or mode.

6. The method of claim 1, wherein:
the frame aggregate value is based on each and every block in the given source frame and the given destination frame.

7. The medium of claim 1, wherein:
the measure of distortion is based on a sampling, wherein the sampling is of:
  pixels in blocks and does not include all pixels of the sampled blocks,
  blocks in the plurality of frames and does not include all blocks in the plurality of frames,
  frames and does not include all of the plurality of frames,
  or a combination thereof.

8. The medium of claim 1, wherein:
each of the plurality of blocks in the given source frame and in the given destination frame is the same size and does not overlap other blocks in the same frame.

9. The medium of claim 1, wherein:
for the given frame, a plurality of different frame aggregate values are determined for a plurality of different types of pixel values corresponding to different color or luminance constituents of an image depicted in the given frame; and
the measure of distortion is based on the plurality of different frame aggregate values.

10. The medium of claim 9, wherein:
different weights are associated with the different types of pixel values; and
the measure of distortion is based on a weighted combination of the plurality of different frame aggregate values in which different frame aggregate values are multiplied by their respective corresponding one of the different weights.

11. The medium of claim 10, wherein:
a weight associated with pixel values indicating luminance is greater than a weight associated with pixel values indicating a constituent color.

12. The medium of claim 1, wherein:
the measure of distortion is a mean of a plurality of frame aggregate values.

13. The medium of claim 1, wherein:
the measure of distortion is a moving mean of a plurality of frame aggregate values of a threshold number of sequential frames in the video data.

14. The medium of claim 1, the operations comprising:
concurrently determining a plurality of differences between source aggregate values and corresponding destination aggregate values.

15. The medium of claim 1, wherein:
the pixel values are residual values indicative of differences between an intra-frame prediction of blocks or inter-frame prediction of blocks and displayed pixel values.

16. The medium of claim 1, the operations comprising:
determining an aggregate amount of data discarded when rounding quotients formed with an element-by-element division of a transform matrix by a quantization matrix; and
storing the aggregate amount of data discarded in association with the destination video data.

17. The medium of claim 1, the operations comprising:
forming the destination video data by encoding in a compressed bitstream the source video data with lossy compression and then decoding the compressed bitstream.

18. The medium of claim 17, the operations comprising:
adjusting the quantization matrix used in encoding the compressed bitstream or encoding a new compressed bitstream representation of the source video data in response to the measure of distortion.

19. The medium of claim 17, the operations comprising:
adjusting values of a transform matrix formed when encoding the compressed bitstream or encoding a new compressed bitstream representation of the source video data in response to the measure of distortion.

20. The medium of claim 1, the operations comprising:
receiving a request for video content from a client computing device;
accessing a library of video content;
sending the compressed video bitstream to the client computing device; and
one or more of:
  determining that the client computing device is associated with a subscription; or
  sending an advertisement to the client computing device for display.

21. A method, comprising:
obtaining, with one or more processors, source video data, the source video data having a plurality of frames, the frames each having a plurality of pixel values;
obtaining, with one or more processors, destination video data, the destination video data being a transformed version of the source video data and having transformed versions of the plurality of frames;
for a given frame, accessing, with one or more processors, a given source frame among the plurality of frames in the source video data and a given destination frame among the plurality of frames in the destination video data, the given destination frame being a transformed version of the given source frame;
segmenting, with one or more processors, the given source frame and the given destination frame into a plurality of blocks, each block corresponding to a region of pixels in the respective frame;
for a plurality of blocks in the given source frame, determining, with one or more processors, a respective source aggregate value that is based on a measure of central tendency of pixel values in the respective block of the given source frame;
for a plurality of blocks in the given destination frame, determining, with one or more processors, a respective destination aggregate value that is based on a measure of central tendency of pixel values in the respective block of the given destination frame;

determining, with one or more processors, a plurality of differences between source aggregate values and corresponding destination aggregate values of the given frame;

determining, with one or more processors, a frame aggregate value that is based on a measure of central tendency of the determined differences between source aggregate values and corresponding destination aggregate values of the given frame;

determining, with one or more processors, a measure of distortion of the destination video data relative to the source video data based on the frame aggregate value and a plurality of other frame aggregate values of a plurality of other frames; and storing, with one or more processors, the measure of distortion in memory in association with the destination video data.

* * * * *